United States Patent [19]

Cooperman et al.

[11] Patent Number: 4,778,843

[45] Date of Patent: Oct. 18, 1988

[54] POLYAMIDE RHEOLOGICAL ADDITIVE CAPPED WITH MONOCARBOXYLIC ACID HAVING OLEFINIC UNSATURATION OR HYDROXYL GROUP AND CONTAINING 16–22 CARBON ATOMS

[75] Inventors: Murray C. Cooperman, Woodbridge; Ashok K. Mehta, Piscataway, both of N.J.

[73] Assignee: NL Chemicals, Inc., Hightstown, N.J.

[21] Appl. No.: 939,685

[22] Filed: Dec. 9, 1986

[51] Int. Cl.$^4$ .............................................. C08G 69/34
[52] U.S. Cl. .................................... 524/606; 100/243; 524/379; 528/295.3; 528/295.5; 528/332; 528/335; 528/336; 528/339.3
[58] Field of Search ...................... 528/339.3, 336, 332, 528/335, 295.3, 295.5; 524/379, 606; 260/404.5 PA; 106/243

[56] References Cited

U.S. PATENT DOCUMENTS 3,412,115 11/1968 Floyd et al. ...................... 528/339.3
3,957,733 5/1976 Rogier et al. ..................... 528/339.3
4,055,525 10/1977 Cheng .............................. 528/339.3

FOREIGN PATENT DOCUMENTS 0210157 1/1987 European Pat. Off. .
2177411 1/1987 United Kingdom .
2177412 1/1987 United Kingdom .

*Primary Examiner*—Harold D. Anderson
*Attorney, Agent, or Firm*—Burns, Doane, Swecker & Mathis

[57] ABSTRACT

A polyamide rheological additive especially for organic solvent-based compositions which comprises the reaction product of a defined polycarboxylic acid, active hydrogen compound and capping agent. The additive exhibits excellent efficiency and dispersibility and is especially effective when first predispersed in an organic solvent. Organic solvent-based compositions which may be thickened using the rheological additive are aromatic, aliphatic and some moderately polar solvent-based compositions.

62 Claims, No Drawings

POLYAMIDE RHEOLOGICAL ADDITIVE CAPPED WITH MONOCARBOXYLIC ACID HAVING OLEFINIC UNSATURATION OR HYDROXYL GROUP AND CONTAINING 16–22 CARBON ATOMS

BACKGROUND OF THE INVENTION

I. Field of the Invention

The present invention relates to a polyamide rheological additive and a solution containing the additive. The present invention also relates to a thickened composition containing the additive.

II. Description of the Prior Art

The art has constantly sought materials which may be used to control the rheological properties of various compositions. One type of material which has been shown to be useful to thicken various organic compositions is organomodified clay. Exemplary U.S. patents which describe different kinds of organomodified (otherwise known as organophilic) clays are U.S. Pat. Nos. 4,081,496, 4,105,578, 4,116,866, 4,193,806, 4,208,218, 4,216,135, 4,287,086, 4,391,637, 4,410,364, 4,412,018, 4,434,075, 4,434,076, 4,450,095 and 4,517,112.

Other types of rheological additives have been designed to thicken aqueous based compositions. Such additives can be based on polyurethanes such as disclosed in U.S. Pat. Nos. 4,079,028, 4,155,892, 4,436,862 and 4,499,233.

Certain types of polyamides have also been employed as rheological additives. Thus, for example, U.S. Pat. No. 4,462,926 discloses a thixotropising agent for unsaturated polyester resins consisting of at least one cyclohexylamide of a saturated fatty acid which contains at least 10 carbon atoms and one or more oligomeric ester amides which have an average molecular weight of from 600 to 3,000, a content of carboxylic acid amide groups of from 1.5 to 15% by weight and a content of carboxylate groups of from 2 to 13% by weight.

A different type of polyamide thixotropic agent is set forth in U.S. Pat. No. 3,131,201 which describes a resinous composition which is the reaction product of an alkyl diamine having from 2 to 6 carbon atoms and two terminal primary amines with a copolymer formed by the reaction of a glyceride of a polyunsaturated fatty acid having an iodine value above 130 and a conjugated alicyclic diene hydrocarbon monomer.

While urelated to a rheological additive, U.S. Pat. No. 2,410,788 describes fatty amide polymers which are suitable for modifying the properties of textile fibers. The polymers are resinous or semi-resinous materials in which dialcohol substituted carboamido compounds carrying side chains containing polyamino acid amide radicals are linked together by reaction with polybasic acids.

In U.S. Pat. No. 3,037,871, a polyamide resin binder for printing inks is obtained from a combination of dimerized fatty acids and dimerized rosin acids with an alkylene diamine having from 2 to 6 carbon atoms, preferably ethylene diamine.

U.S. Pat. No. 3,957,733 sets forth an engineering plastic which is a polyamide of a 19 carbon diacid and trimethylhexamethylene diamine.

Finally, U.S. Pat. No. 4,062,819 describes polyamide blends having improved flow characteristics and rheological properties which are formed from a nylon-type polyamide and a minor amount of a polyamide derived from a high molecular weight dibasic acid. The second polyamide is more specifically obtained by the reaction of a long-chain dibasic acid containing 18 or more carbon atoms and a diamine or mixture of diamines.

Despite the numerous types of rheological additives known in the art, an ongoing search has been made for new rheological additives which are highly efficient and are readily dispersible in the composition to be thickened. The present invention is a result of such investigation.

OBJECTS AND SUMMARY OF THE INVENTION

It is accordingly a general object of the present invention to provide an improved rheological additive for organic compositions.

It is a more specific object of the present invention to provide a polyamide rheological additive which is efficient in thickening organic compositions.

It is a further object of the present invention to provide a polyamide rheological additive that can be readily dispersed in the organic composition to be thickened.

It is a further object of the present invention to provide a solution of the polyamide rheological additive in an organic solvent which solution exhibits a further improvement in efficiency.

It is a still further object of the present invention to provide an organic solvent solution of a polyamide rheological additive which exhibits improved efficiency and remains fluid in storage at ambient temperatures.

It is a still further object of the present invention to provide an organic solvent solution of a polyamide rheological additive which is easy to handle and which can readily be incorporated into organic compositions.

It is a yet further object of this invention to provide an efficient rheological additive for organic solvent based systems which, once dispersed in said system, will remain so, and thus will not form "seeds" (large agglomerates) on storage of the organic solvent based system.

In one aspect, the present invention provides a rheological additive which comprises the reaction product of:

(a) polycarboxylic acid having at least 5 carbon atoms per carboxylic acid group;

(b) active hydrogen compound having the formula $X_m$-R-$Y_n$ wherein R represents a group containing from 2 to 12 carbon atoms, X and Y are independently selected from primary amino, secondary amino and hydroxyl and m and n are at least 1 and the sum of (m+n) is at least 2, with the proviso that at least 90% of the X and Y groups participating in the reaction are primary amino, secondary amino or a mixture thereof; and (c) capping agent comprised of monocarboxylic acid which is at least one of unsaturated and hydroxylated, said capping agent being present in an amount sufficient to cap the reaction product of the polycarboxylic acid and the active hydrogen compound.

In other aspects, the present invention provides a solution formed by dissolving the polyamide rheological additive in an organic solvent and a thickened organic composition containing the polyamide rheological additive.

Further advantages and features of the invention, as well as the scope, nature and utilization of the invention will become apparent to those skilled in the art from the description of the preferred embodiments of the invention set forth below.

DESCRIPTION OF THE PREFERRED EMBODIMENTS

As stated hereinabove, one aspect of the present invention relates to a polyamide rheological additive comprising the reaction product of polycarboxylic acid, active hydrogen compound and monocarboxylic acid capping agent. The polycarboxylic acid has at least 5 carbon atoms, preferably from 6 to 36 carbon atoms and most preferably from 16 to 20 carbon atoms per carboxylic acid group. While polycarboxylic acids having more than 2 carboxylic acid groups may be employed, the amount of such acids should be limited to avoid extensive crosslinking which would render the reaction product insoluble in the intended organic composition. This typically means that less than about 80 percent by weight, preferably less than 20 percent by weight and most preferably less than 5 percent by weight of the total amount of polycarboxylic acid should have three or more carboxylic acid groups.

Illustrative polycarboxylic acids include sebacic acid, poly(butadiene)dioic acids, dodecane dicarboxylic acid and mixtures thereof. Especially preferred polycarboxylic acids are oligomers of fatty acids having a carbon chain of from 16 to 22 carbon atoms, preferably 16 to 18 carbon atoms. Exemplary fatty acids are those derived from soybean oil, castor oil, tall oil, corn oil, cottonseed oil, kapok seed oil, linseed oil and mixtures thereof. Even further preferred are oligomers of fatty acids which are substantially comprised of the dimerized fatty acid. Typically, the dimerized fatty acid constitutes at least about 20% by weight of the oligomerized fatty acid, preferably at least about 80% by weight and more preferably comprises at least 95% by weight of the oligomerized fatty acid. The oligomerized fatty acid preferably also has a low monomer content such as less than about 10% by weight and more preferably less than about 4% by weight.

Preparation of the oligomerized fatty acid, including the described low monomer content oligomer, is well known in the art and is disclosed, for example, in U.S. Pat. Nos. 2,793,219 and 2,955,121, the contents of which are incorporated by reference. Additionally, suitable oligomerized fatty acids are commercially available such as certain oligomerized fatty acids available under the name Empol from Emery Industries, a division of National Distillers & Chemical Corporation and Sylvadym T-18 available from Arizona Chemical Company.

The active hydrogen compound has the general formula $X_m\text{-R-}Y_n$ wherein R represents a group containing from 2 to 12 carbon atoms and which may contain nonreactive groups, such as ether, alkoxy or halogen groups, X and Y are independently selected from primary amino, secondary amino and hydroxyl and m and n are at least 1, the sum of (m+n) is at least 2, and preferably m and n are each 1. Since the presence of amide groups is essential to the present invention, at least 90%, preferably at least 95% and most preferably all of the X and Y groups participating in the reaction are primary amino, secondary amino or a mixture thereof. Preferably, R represents a group containing from 6 to 12 carbon atoms and more preferably R represents a group containing from 6 to 8 carbon atoms.

As stated above with respect to the polycarboxylic acid, and as is apparent from the general formula, the active hydrogen compound can have 3 or more active groups. However, the amount of active hydrogen compound having 3 or more active groups should not be selected such that the reaction product is crosslinked to an extent such that it is insoluble in the environment of the organic composition in which it is to be used. Typically, this means that the amount of active hydrogen compound having 3 or more active hydrogen groups should be less than about 10 mole percent, preferably less than about 2 mole percent and most preferably it is substantially absent.

Illustrative active hydrogen compounds include polyamines, such as 1,2-diaminoethane, 1,2- and 1,3-diaminopropane, 1,4-diaminobutane, 1,6-diaminohexane, 1,8-diaminooctane, 1,12-diaminododecane, 3,3-diaminopropyl-N-methylamine, N-alkyl-1,3-diaminopropanes wherein the alkyl group is a long carbon chain such as coco or tallow alkyl, soya alkyl, oleyl, stearyl and mixtures thereof, and amino alcohols, such as ethanolamine, 6-aminohexanol, aminoethylethanolamine and mixtures thereof.

Diols which may constitute a portion of the active hydrogen compound are exemplified by 1,2-ethanediol, 1,2- and 1,3-propane diol, 1,4-butane diol, 1,6-hexanediol, diethylene glycol, triethylene glycol and mixtures thereof. However, as discussed above, the amount of diol must be limited such that of the total active hydrogen groups participating in the reaction, at least 90 mole percent must be primary and/or secondary amino.

Preferred active hydrogen compounds are diamines, especially diamines having from 6 to 12 carbon atoms with the most preferred diamine being 1,6-diaminohexane.

The capping agent is used to terminate the reaction product of the polycarboxylic acid and the active hydrogen compound and is a monocarboxylic acid which is at least one of unsaturated and hydroxylated. The monocarboxylic acid generally has from 8 to 22 carbon atoms. While monocarboxylic acids having fewer carbon atoms may be used to achieve certain benefits in environments such as organic solvent-based coatings, such smaller monocarboxylic acid should be limited to less than 20 mole percent, preferably less than 10 mole percent of the total capping agent employed and most preferably are absent.

The structure of the capping agent has a major impact on the performance of the resulting polyamide of this invention. For instance, monocarboxylic acid capping agents which contain unsaturation, especially a single point of unsaturation, such as oleic acid, are found to improve the ultimate efficiency of the additive in an organic solvent-based coating composition versus the saturated monocarboxylic acid analog. In this context, the meaning of the term "ultimate efficiency" is the efficiency of the additive after incorporation into a system under the most optimum conditions for that particular additive.

Hydroxylated saturated monocarboxylic acids, on the other hand, improve the ease of dispersion (incorporation) of the polyamide rheological additive, but reduce its efficiency in an organic solvent-based coating composition. With its increased ease of dispersion, incorporation of a polyamide rheological additive which is capped with a hydroxylated monocarboxylic acid into an organic solvent-based coating composition will require less energy input than for, e.g., a similar polyamide rheological additive capped with an unsaturated and non-hydroxylated monocarboxylic acid. Thus, it is preferred to have a monocarboxylic acid capping agent containing both unsaturation and hydroxylation. Further preferred is a monocarboxylic acid capping agent with a single point of unsaturation (if aliphatic) or a single hydroxyl moiety and even further preferred is a monocarboxylic acid capping agent with a single point of unsaturation (if aliphatic) and a single hydroxyl moiety.

The capping agent may also have a straight or branched chain and may also contain groups, such as tertiary amino, alkoxy, halo, keto, etc., which do not react with the other components used to prepare the rheological additive.

Illustrative unsaturated aliphatic acids include linoleic acid, linolenic acid, oleic acid, monocarboxylic acids derived from dehydrated castor oil, undecylenic acid, tall oil fatty acids, soya fatty acids, and mixtures thereof. Aromatic acids, such as benzoic acid, salicylic acid and mixtures thereof may also be employed as a portion of the total capping agent.

Hydroxylated monocarboxylic acids include ricinoleic acid, 12-hydroxystearic acid, 12-hydroxydodecanoic acid, and mixtures thereof. The most preferred capping agent is ricinoleic acid.

A portion of the capping agent may be composed of a compound which is not a monocarboxylic acid which is unsaturated and/or hydroxylated. For example, a portion of the capping agent may be composed of at least one non-hydroxylated, saturated aliphatic monocarboxylic acid such as octanoic acid, nonanoic acid, dodecanoic acid, octadecanoic acid, docosanoic acid, hydrogenated tallow acids, stearic acid and mixtures thereof. However, to obtain significant advantageous results imparted by the described monocarboxylic acid capping agent at least about 25 mole percent, preferably at least about 50 mole percent and most preferably at least about 90 mole percent of the capping agent actually reacted should be the described unsaturated and/or hydroxylated monocarboxylic acid.

From the foregoing discussion, it can be understood that an especially preferred aspect of the present invention is a polyamide rheological additive which is the reaction product of oligomer of fatty acid having a carbon chain of from 16 to 18 carbon atoms, diamine having from 6 to 12 carbon atoms and unsaturated and hydroxylated monocarboxylic acid having from 16 to 22 carbon atoms as capping agent with the most preferred capping agent being ricinoleic acid. It can also be understood that while additional group and/or components can be present, the presence of such materials should not be present to substantially adversely affect the ability of the rheological additive to function in its intended environment and in this respect the reaction product consists essentially of the defined components.

The specific types and amounts of the reactants are selected so as to obtain a nonresinous reaction product which can be dispersed in the intended organic composition and which will function as a rheological additive. Thus, the amount of active hydrogen compound reacted to form the reaction product is in the range of from about 1.0 to about 4.0, preferably from about 1.0 to about 3.0 and most preferably from about 1.0 to about 2.0 moles per mole of the reacted polycarboxylic acid.

The amount of capping agent selected is sufficient to cap the active hydrogen compound ends of the reaction product of the polycarboxylic acid and the active hydrogen compound. Typically, the amount of the capping agent reacted to form the reaction product is in the range of from about 0.1 to about 4.0, preferably from about 0.17 to about 2.0 and most preferably from about 0.3 to about 2.0 moles per mole of the reacted polycarboxylic acid.

As should be apparent to those skilled in the art, the molar amounts of the components in the reaction mixture may be different than that of the formed polyamide rheological additive. That is, one or more of the reactants may be employed in excess. Typically, for instance, it has been found advantageous to use a 2-10% molar excess of the active hydrogen compound (e.g., diamine) which accelerates the reaction and makes up for that lost by co-distillation with the water of reaction. The number average molecular weight of the reaction product ranges from about 500 to about 12,000, preferably from about 1,250 to about 8,500 and most preferably from about 1,250 to about 4,000. It can therefore be understood from this discussion that the polyamide rheological additive is not a polymeric resin, but is instead a relatively low molecular weight compound.

The polyamide rheological additive may be prepared according to known techniques. For example, the reactants may be charged to a suitable reaction vessel which is equipped with a mechanical stirrer, a thermometer, a Dean-Stark trap-Bartlett modification and a nitrogen inlet. The vessel can be heated with stirring under a nitrogen blanket. After completion of the reaction which can be determined by acid number (e.g., preferably less than about 4), the polyamide is cooled and is discharged. If amenable to grinding, the polyamide can then be ground to a fine particle size. The degree of particle size reduction required or preferred is dependent on the particular polyamide rheological additive composition, or more properly, on the melting point of the particular polyamide composition, with the harder, higher melting polyamide compositions requiring a finer particle size in order to achieve a satisfactory degree of dispersion of the rheological additive in the application in which it is employed.

While not indicative of every possible polyamide rheological additive of the present invention, a preferred general formula can be set forth as follows:

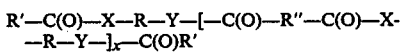

wherein R′ is the residue of the monocarboxylic acid capping agent, R represents a group containing from 2 to 12 carbon atoms, X and Y are the residues of primary amino, secondary amino or hydroxyl groups, R″ is the residue of the polycarboxylic acid, and x is from 1 to 17, preferably from 1 to 12 and most preferably is from 1 to 5.

The polyamide rheological additives of the present invention are a marked advance in the art. In contrast to some particulate-type rheological additives, which are exemplified by organomodified clays and finely divided (fumed) silica, the polyamide rheological additives of the present invention can have excellent flow and levelling properties, as well as excellent efficiency and dispersing characteristics. Additionally, coating compositions containing the polyamide rheological additives of the present invention may be prepared such that large agglomerates (sometimes referred to as "seeds") which sometimes form on storage of coating compositions containing prior art thixotropes can be avoided.

The polyamide rheological additive of the present invention may be used to thicken a variety of organic solvent-based compositions and it is believed that the rheological additive can also be used in some solvent-free compositions. The additive is particularly useful, for example, in thickening aliphatic and aromatic solvent-based compositions and, while not as efficient, may also be used in certain moderately polar (e.g., ketones and alcohols) based compositions. Illustrative organic solvent-based compositions include aliphatic alkyd paints such as Trade Sales solvent-based paints and varnishes; aromatic solvent-based paints based on acrylic, alkyd and polyester binders, such as standard quality industrial paints which include appliance enamels, equipment enamels, and automotive refinish enamels; and certain sealants. Although not completely determinative of all utilities, a useful screening test is to dissolve the rheological additive in xylene in an amount of 10% by weight at 60° C. to determine if a non-pourable, clear or slightly cloudy gel forms upon cooling to room temperature. Such gel formation is indicative of an acceptable polyamide rheological additive.

It can be understood that the amount of polyamide rheological additive used in a specific instance is determined by numerous factors including the reactants used in the preparation of the additive, the type of organic solvent-based composition to be thickened and the level of thickening desired. However, a general range is from about 1.5 to about 30 pounds per hundred gallons of composition. On a weight basis, the amount of polyamide rheological additive is generally from about 0.1 to about 5% by weight, preferably from about 0.1 to about 3% by weight and most preferably from about 0.2 to about 1% by weight.

To further improve the efficiency and handling of the polyamide rheological additive in the organic composition and/or to effectively use those polyamides which may not be amenable to grinding, the polyamide can be first pre-dispersed in a compatible organic solvent, especially at a slightly elevated temperature. Typically, the solvent contains at least about 10% by weight of an alcohol and preferably contains at least about 25% by weight of an alcohol. Representative alcohols include methanol, ethanol, 1-propanol, 2-propanol, 1-butanol, 2-butanol, isobutanol, isoamyl alcohol, and mixtures thereof with the preferred alcohol being 2-propanol.

It is believed that the function of the alcohol solvent is to hydrogen bond with the polyamide, which interaction negates or substantially reduces the intermolecular polyamide-polyamide interactions. Once the additive is dispersed in e.g., a coating composition, the concentration of the alcohol is so small that it is ineffective in substantially reducing the interactions of the polyamide with itself or with other components of the system.

By using an alcohol solution of the rheological additive, greater latitude can be employed in selecting the amounts of the reactants used to prepare the rheological additive. For example, the amount of groups participating in the reaction from the active hydrogen compound can be reduced from 90% amino to at least 50% amino groups. However, even in this instance, it is preferred to employ more amino groups and that accordingly it is preferred that at least 75% of the groups participating in the reaction from the active hydrogen compound are primary and/or secondary amino groups.

The remaining portion of the solvent can be any organic solvent, which, with the alcohol, will provide a fluid solution of the polyamide rheological additive and which will be compatible with the intended application of the additive. Preferred cosolvents are aromatic solvents, such as benzene, toluene, xylenes, ethyl benzene, naphthalene-containing solvents and mixtures thereof, and aliphatic solvents such as mineral spirits, mineral oil, hexanes, heptanes and mixtures thereof, with the most preferred cosolvents being toluene and xylenes.

The preferred combination of solvents is 2-propanol and toluene in a weight ratio of from about 1:1 to about 1:9 and most preferably from about 1:1 to 1:4. Such a combination provides a solution which remains fluid on storage at ambient temperatures and functions as an efficient rheological additive (thixotrope) when used in an organic solvent based application.

The amount of polyamide rheological additive which can be pre-dispersed in the solvent understandably varies depending on several factors, but generally is in the range of from about 5 to about 75% by weight, preferably from about 25 to about 50% by weight.

The following inventive samples and comparative samples are presented to illustrate and contrast the present invention. However, the examples should not be construed as limiting the invention.

Preparation of Rheological Additive

A one liter resin flask, equipped with a mechanical stirrer, a thermometer, a Dean-Stark trap-Bartlett modification and a nitrogen inlet is charged with molten or liquid active hydrogen compound, polycarboxylic acid and capping agent. The mixture is heated with stirring under a nitrogen blanket. Water begins to be evolved at approximately 150°-155° C. After 2 hours at 180°-195° C., aliquots are removed hourly and analyzed for acid number and the reaction is continued until the acid number reaches a minimum or falls below 4.

The reaction product is cooled to 140°-145° C. and is discharged into a stainless steel tray and allowed to cool overnight. The product is then diced and ground to a fine powder using a Waring Blendor, if amenable to grinding. Depending on the melting point of the reaction product, it may be further ground using a jet mill and the fine particle size product isolated by sieving prior to analysis.

Rheological Additive Reactants and Characteristics

Various reactants were used to prepare rheological additive samples in accordance with the procedure set forth above. The reactants, the molar amounts thereof, the acid value as determined by titration, the melting point and general comments concerning the reaction product are set forth below in Table I.

TABLE I

| Sample No. | Additive Reactants | Molar Amounts | Acid Value | Melting Point (°C.) | Comments |
|---|---|---|---|---|---|
| 1 | Ricinoleic acid | 1.00 | 2.62 | 72 | light amber solid which forms a white powder upon grinding |
|  | Empol 1014 | 0.50 |  |  |  |
|  | 1,6-diaminohexane | 1.023 |  |  |  |
| 2 | Ricinoleic acid | 0.30 | 2.55 | 80 | light amber solid |

TABLE I-continued

| Sample No. | Additive Reactants | Molar Amounts | Acid Value | Melting Point (°C.) | Comments |
|---|---|---|---|---|---|
| | Empol 1014 | 0.15 | | | which forms a white powder upon grinding |
| | 1,12-diaminododecane | 0.31 | | | |
| 3 | Oleic acid | 12.93 lbs | 4.44 | 96 | white powder |
| | Empol 1014 | 13.36 lbs | | | |
| | 1,6-diaminohexane | 2595 gr | | | |
| 4 | Stearic acid | 0.15 | 20.45 | 109 | white powder |
| | Benzoic acid | 0.15 | | | |
| | Empol 1024 | 0.15 | | | |
| | Ethylene diamine | 0.31 | | | |
| Comparative A | Oleic acid | 0.30 | 7.01 | 92 | white powder |
| | Empol 1014 | 0.15 | | | |
| | 1,6-diaminohexane | 0.24 | | | |
| | Hexanediol | 0.08 | | | |
| 5 | Ricinoleic Acid | 0.20 | 2.24 | 76 | off-white powder |
| | Empol 1014 | 0.30 | | | |
| | 1,6-diaminohexane | 0.405 | | | |
| 6 | Ricinoleic Acid | 0.20 | 2.07 | 80 | off-white powder |
| | Empol 1014 | 0.40 | | | |
| | 1,6-diaminohexane | 0.505 | | | |
| 7 | Ricinoleic Acid | 0.20 | 3.22 | 83 | off-white powder |
| | Empol 1014 | 0.50 | | | |
| | 1,6-diaminohexane | 0.605 | | | |
| 8 | Ricinoleic Acid | 0.20 | 3.03 | 89 | off-white powder |
| | Empol 1014 | 0.80 | | | |
| | 1,6-diaminohexane | 0.905 | | | |
| 9 | Ricinoleic Acid | 0.20 | 2.74 | 87 | off-white powder |
| | Empol 1014 | 1.00 | | | |
| | 1,6-diaminohexane | 1.11 | | | |
| 10 | Ricinoleic Acid | 0.20 | 4.04 | 92 | off-white powder |
| | Empol 1014 | 1.10 | | | |
| | 1,6-diaminohexane | 1.205 | | | |
| Comparative B | Ricinoleic Acid | 0.04 | 2.66 | 94 | off-white powder |
| | Empol 1014 | 0.38 | | | |
| | 1,6-diaminohexane | 0.41 | | | |
| 11 | Ricinoleic Acid | 0.30 | 1.37 | 82 | tan powder |
| | Empol 1040 | 0.15 | | | |
| | 1,6-diaminohexane | 0.31 | | | |
| 12 | 12-Hydroxystearic acid | 0.30 | 6.11 | 128 | white powder |
| | Empol 1024 | 0.15 | | | |
| | ethylene diamine | 0.33 | | | |
| 13 | Ricinoleic Acid | 0.20 | 2.21 | 78 | off-white powder |
| | Empol 1024 | 0.30 | | | |
| | 1,6-diaminohexane | 0.405 | | | |
| 14 | Ricinoleic Acid | 136.4 lb. (eq. to .453 moles) | 1.60 | 69 | off-white powder |
| | Empol 1014 | 129.2 lb. (eq. to .229 moles) | | | |
| | 1,6-diaminohexane | 54.4 lb. (eq. to .468 moles) | | | |

In Table I:
(a) Empol 1024 is dimerized fatty acid available from Emery Industries and contains 77% dibasic acid, 15% polybasic acid and 8% monobasic acid.
(b) Empol 1014 is a dimerized fatty acid available from Emery Industries and typically contains 91% dibasic acid, 5% polybasic acids, and 4% monobasic acid.
(c) Empol 1040 is an oligomerized fatty acid available from Emery Industries and typically contains 80% polybasic acids, 18% dibasic acid, and 2% monobasic acid.

Evaluation of Rheological Additives

A number of the previously described samples were incorporated into a standard aromatic alkyd gloss enamel at a loading of 10 pounds per hundred gallons and a number of tests were conducted. More specifically, the fineness of grind (indicative of dispersability) was determined using a Hegman gauge, the viscosity was determined using a Brookfield RTV Viscometer with a No. 3 spindle at 10 and 100 rpms, the thixotropic index was calculated and the Stormer viscosity (in Krebs Units) and Sag Resistance (in mils) were determined. The gloss enamel without the additive had a Stormer viscosity of 65 Krebs Units and a Sag Resistance Value of 6 mils. The result of the tests are set forth in Table II.

The preparation and components of the aromatic alkyd gloss enamel is a follows:

| RAW MATERIAL | POUNDS[1] | GALLONS[1] |
|---|---|---|
| Duramac 2434 | 212.0 | 24.94 |
| Xylene | 60.0 | 8.33 |
| While stirring slowly add: | | |
| Rheological additive | 10.0 | |
| Mix for 5 minutes at 3000 rpms. Use 1 HP Premier high speed dispersator provided with 1⅜" diameter blade. Reduce speed and add: | | |
| BYK 104S | 10.0 | 1.27 |
| Titanox 2101 | 280 | 8.41 |
| Heat to 120 or 150° F., increase velocity of high speed | | |

-continued

| RAW MATERIAL | POUNDS[1] | GALLONS[1] |
|---|---|---|
| dispersator to 5,400 rpm. Disperse for 15 minutes. Maintain temperature. Reduce speed, add: | | |
| LETDOWN | | |
| Duramac 2434 | 388.0 | 45.65 |
| Xylene | 73.5 | 10.20 |
| 6% Cobalt Nuxtra | 4.0 | 0.55 |
| Exkin 2 | 1.00 | 0.13 |
| TOTAL | 1038.5 | 99.48* |
| Mix at low speed while cooling to 80° F. with ice water | | |

[1]Basic formulation; test composition may be prepared with different amounts, but proportional to those set forth.
Duramac 2434 is an air drying medium oil alkyd resin in a xylene solvent available from McWhorter, Inc.
BYK 104S is a dispersant available from Byk.-Mallinckrodt of Mallinckrodt, Inc.
Titanox 2101 is a titanium dioxide pigment available from NL Chemicals, Inc.
6% Cobalt Nuxtra is a drier available from Nuodex, Inc.
Exkin 2 is an anti-skinning agent available from Nuodex, Inc.
*The total amount of gallons does not include the gallon amount of rheological additive which can vary depending on its density.

TABLE II

| Sample No. | Fineness of Grind | Brookfield Viscosity 10 rpm | Brookfield Viscosity 100 rpm | Thixotropic Index | Stormer Viscosity (Krebs Units) | Sag (mils) |
|---|---|---|---|---|---|---|
| 1 | 6.5A | 5680 | 1860 | 3.05 | 95 | 35 |
| 2 | 5.0B | 7080 | 2220 | 3.18 | 99 | 35 |
| 3 | 4.0B | 4780 | 1662 | 2.88 | 94 | 25 |
| 4 | 5.0A | 3280 | 1280 | 2.56 | 87 | 16 |
| Comparative A | 4.5B | 1980 | 1080 | 1.83 | 85 | 10 |
| 5 | 6.5A | 6920 | 2284 | 3.03 | 101 | 40 |
| 6 | 6.5A | 6680 | 2240 | 2.98 | 100 | 40 |
| 7 | 6.5A | 6920 | 2168 | 3.19 | 99 | 40 |
| 8 | 6.5A | 5760 | 1912 | 3.01 | 97 | 35 |
| 9 | 6.5A | 5692 | 2010 | 2.83 | 99 | 35 |
| 10 | 6.5A | 5610 | 1920 | 2.92 | 98 | 30 |
| Comparative B | 0 | 600 | 568 | 1.06 | 74 | 5 |
| 11* | 6.0A | 2520 | 1016 | 2.48 | 82 | 14 |
| 12 | 3.5A | 1450 | 890 | 1.63 | 76 | 8 |
| 13* | 6.5A | 3560 | 1300 | 2.74 | 86 | 25 |
| 14* | 6.5A | 3320 | 1204 | 2.76 | 85 | 18 |

*At 5.0 pound loadings of rheological additive instead of 10.0 pound loading.

Evaluation of Gloss

The difference in the 60° gloss of films prepared from paints stored overnight under ambient conditions and those stored at elevated temperatures for varying periods of time was used as a measure of the resistance to the formation of agglomerates; the closer the values were to each other, the more resistant are these additives to the formation of these agglomerates. Typically, drawdowns were prepared of paints prepared according to the formulation given above after aging these paints at room temperature overnight, and the 60° gloss determined after curing of these films under ambient conditions. The paints were then placed in a 200° F. oven for 16 hours, cooled to 25° C. in a water bath, and drawdowns were again prepared; the 60° gloss values were measured on these films after curing for 24 hours at room temperature.

In certain cases, if the differences in gloss between the film of the paint which had been stored overnight at room temperature and that of the paint which had been oven aged was small, the paints were stored at 200° F. for an additional 16 hours and an additional 32 hours, followed after each time interval by a repetition of the gloss measurement of films prepared from the paints after cooling to room temperature (4 days total). In each case, in addition to measuring the gloss, the films were observed for obvious visual (e.g., visible to the naked eye) seeding. The results of these tests are set forth in Table III.

TABLE III

| | GLOSS | | | |
|---|---|---|---|---|
| Sample No. | Aged Overnight at Room Temperature | 200° F. 1 day | 200° F. 2 days | 200° F. 4 days |
| 1 | 72 | 21 | 12 | 10 |
| 2 | 86 | 15 | 13 | 12 |
| 3 | 86 | 17 | nd | nd |
| 4 | 89 | 20 | nd | nd |
| 5 | 52 | 23 | nd | nd |
| 8 | 57 | 30 | nd | nd | nd = not determined

Effect of Predispersion in Organic Solvent

To evaluate the effect of predispersing the rheological additive in organic solvents, several samples of the additive are prepared in the manner previously described, dissolved in varying amounts in organic solvents, added to the aromatic alkyd gloss enamel described above and tested for fineness of grind, viscosity (Broofield and Stormer), sag and gloss. The rheological additives and solvent solutions are set forth in Table IV and the results of the evaluation of the aromatic alkyd gloss enamel are set forth in Table V.

TABLE IV

| Sample No. | Additive Reactants | Molar Amounts | Solvent and Weight % | Comments |
|---|---|---|---|---|
| 15 | Empol 1014 | 0.50 | 42.19% in butanol | clear solution |
| | 1,6-diaminohexane | 1.023 | | |
| | Ricinoleic Acid | 1.00 | | |
| 16 | Empol 1014 | 0.50 | 40.14% in 2-propanol | clear solution |
| | 1,6-diaminohexane | 1.023 | | |
| | Ricinoleic Acid | 1.00 | | |
| 17 | Empol 1014 | 0.50 | 39.93% in 2-propanol | clear solution |
| | 1,6-diaminohexane | 1.023 | | |
| | Ricinoleic Acid | 1.00 | | |
| 18 | Empol 1014 | 0.50 | 25.86% in 2-propanol | clear solution |
| | 1,6-diaminohexane | 1.023 | | |
| | Ricinoleic Acid | 1.00 | | |
| 19 | Empol 1014 | 0.50 | 25.79% in mixture of 60% by weight toluene and 40% by weight butanol | clear solution |
| | 1,6-diaminohexane | 1.023 | | |
| | Ricinoleic Acid | 1.00 | | |
| 20 | Empol 1014 | 0.15 | 29.30% in 2-propanol | clear solution |
| | 1,6-diaminohexane | 0.24 | | |
| | Ricinoleic Acid | 0.30 | | |
| | Hexanediol | 0.08 | | |
| 21 | Empol 1014 | 0.50 | 40.55% in a 3:1 (by weight) toluene:2-propanol mixture | clear solution |
| | 1,6-diaminohexane | 1.023 | | |
| | Ricinoleic Acid | 1.00 | | |

TABLE V

| Sample No. | Fineness of Grind | Brookfield Viscosity 10 RPM | Brookfield Viscosity 100 RPM | Thixotropic Index | Stormer Viscosity (Krebs Units) | Sag (mils) | Gloss 200° F. 0 day | Gloss 200° F. 2 days | Gloss 200° F. 4 days |
|---|---|---|---|---|---|---|---|---|---|
| 15 | 6.5A | 4160 | 1416 | 2.94 | 88 | 30 | 50 | 82 | 76 |
| 16 | 6.5A | 7020 | 2220 | 3.16 | 99 | 40+ | 70 | 62 | 35 |

TABLE V-continued

| Sample No. | Fineness of Grind | Brookfield Viscosity 10 RPM | Brookfield Viscosity 100 RPM | Thixotropic Index | Stormer Viscosity (Krebs Units) | Sag (mils) | Gloss 200° F. 0 day | Gloss 200° F. 2 days | Gloss 200° F. 4 days |
|---|---|---|---|---|---|---|---|---|---|
| 17 | 6.5A | 5980 | 1780 | 3.36 | 94 | 35+ | 66 | 69 | 39 |
| 18 | 6.5A | 6080 | 2080 | 2.92 | 98 | 30+ | 81 | 42 | |
| 19 | 6.5A | 3890 | 1320 | 2.95 | 86 | 20+ | 80 | 40 | |
| 20 | 6.5A | 4740 | 1728 | 2.74 | 93 | 20 | 81 | 43 | |
| 21 | 6.5A | 7760 | 2892 | 2.68 | 106 | 35 | 83 | 59 | |

Further samples of the polyamide rheological additive of the present invention were evaluated for fineness of grind, Brookfield and Stormer viscosities, Sag and Gloss using the procedures discussed previously in an aliphatic gloss enamel formulation.

| Raw Material | Grams |
|---|---|
| 1266 M70 Alkyd resin | 150.0 |
| Mineral Spirits 66/3 | 25.0 |
| Stir at 3000 rpm using a Premier Dispermat fitted with a 1⅜" Cowles sawtooth blade. Add: | |
| Rheological Additive | 7.2 |
| Mix well for 3 minutes at 3000 rpm, then add: | |
| 2101 Titanium Dioxide Pigment | 325.0 |
| Grind at 5400 rpm using the above described mixer for 15 minutes while maintaining the temperature at 150° F. | |
| Cool the paint to 135° F. and mix at 2000 rpm while adding the following: | |
| 1266 M70 Alkyd Resin | 401.6 |
| 24% Zirconium Nuxtra (Drier) | 1.35 |
| 6% Calcium Nuxtra (Drier) | 4.00 |
| 6% Cobalt Nuxtra (Drier) | 5.22 |
| Exkin 2 Antiskinning Agent | 1.10 |
| Mineral Spirits 66/3 | 100.3 |

1266 M70 Alkyd Resin is available from NL Chemicals, Inc.
Mineral Spirits 66/3 is a Rule 66 compliant mineral spirits, available from Ashland Chemical Company, Industrial Chemicals and Solvents Division.
2101 Titanium Dioxide pigment is available from NL Chemicals, Inc.
The Nuxtra driers are available from Nuodex, Inc.
Exkin 2 Antiskinning Agent is available from Nuodex, Inc.

Polyamide rheological additives prepared in accordance with the procedure set forth above were incorporated into the aliphatic gloss enamel and the results are as follows:

TABLE VI

| Sample No. | FOG | Brookfield Viscosity 10 rpm | Brookfield Viscosity 100 rpm | Thixotropic Index | Stormer Viscosity | Sag | Gloss Overnight at Room Temperature | Gloss 200° F. 1 day |
|---|---|---|---|---|---|---|---|---|
| 5 | 6.5A | 4280 | 2036 | 2.10 | 99 | 12 | 86 | 86 |
| 14 | 6.5A | 2960 | 1644 | 1.80 | 94 | 8 | 85 | — |
| 22* | 6.5A | 7200 | 2632 | 2.74 | 104 | 25 | 80 | 82 |

*Sample 22 was Sample 5 dissolved in a 3:1 toluene/2-propanol solution to form a 40% by weight solution.

The invention being thus described, it will be obvious that the same may be varied in many ways. However, such variations are not to be regarded as a departure from the spirit and scope of the invention and all such modifications are intended to be included within the scope of the following claims.

We claim:

1. A polyamide rheological additive comprising the reaction product of:
   (a) polycarboxylic acid having at least 5 carbon atoms per carboxylic acid group;
   (b) active hydrogen compound having the formula $X_m$—R—$Y_n$ wherein R represents a group containing from 2 to 12 carbon atoms, X and Y are independently selected from primary amino, secondary amino or hydroxyl and m and n are at least 1 and the sum of (m+n) is at least 2 with the proviso that at least 90% of the X and Y groups participating in the reaction are selected from primary amino, secondary amino or a mixture thereof; and
   (c) capping agent comprised of monocarboxylic acid having from 16 to 22 carbon atoms and which is at least one of unsaturated or hydroxylated, said capping agent being present in an amount sufficient to cap the active hydrogen compound ends of the reaction product of the polycarboxylic acid and the active hydrogen compound wherein the amount of the active hydrogen compound reacted to form the reaction product is from about 1.0 to about 4.0 moles per mole of reacted polycarboxylic acid and wherein the amount of capping agent is in the range of from about 0.17 to about 2.0 moles per mole of polycarboxylic acid.

2. The polyamide rheological additive of claim 1 wherein the polycarboxylic acid is an oligomer of fatty acid having from 16 to 22 carbon atoms.

3. The polyamide rheological additive to claim 2 wherein the oligomer is prepared from a fatty acid derived from an oil selected from the group consisting of soybean oil, castor oil, tall oil, corn oil, cottonseed oil, kapok seed oil, linseed oil and mixtures thereof.

4. The polyamide rheological additive of claim 3 wherein the oligomer is comprised of the dimer of a fatty acid having 16 to 18 carbon atoms.

5. The polyamide rheological additive of claim 4 wherein the oligomer is comprised of at least about 20% by weight of said fatty acid dimer.

6. The polyamide rheological additive of claim 3 wherein the oligomer contains less than about 10% by weight of fatty acid monomer.

7. The polyamide rheological additive of claim 1 wherein R represents a group containing from 6 to 12 carbon atoms.

8. The polyamide rheological additive of claim 7 wherein R represents a group containing 6 to 8 carbon atoms.

9. The polyamide rheological additive of claim 1 wherein at least 95% of the X and Y groups participating in the reaction are primary amino, secondary amino or a mixture thereof.

10. The polyamide rheological additive of claim 9 wherein the active hydrogen compound includes a diamine having from 2 to 12 carbon atoms.

11. The polyamide rheological additive of claim 10 wherein the diamine is 1,6-diaminohexane.

12. The polyamide rheological additive of claim 1 wherein the active hydrogen compound includes an aminoalcohol.

13. The polyamide rheological additive of claim 1 wherein the active hydrogen compound includes a diol.

14. The polyamide rheological additive of claim 1 wherein less than about 10 mole percent of the active hydrogen compound has the sum of (m+n) being at least 3.

15. The polyamide rheological additive of claim 1 wherein less than about 2 mole percent of the active hydrogen compound has the sum of (m+n) being at least 3.

16. The polyamide rheological additive of claim 1 wherein the monocarboxylic acid capping agent is hydroxylated.

17. The polyamide rheological additive of claim 16 wherein the monocarboxylic acid capping agent contains a single hydroxyl group.

18. The polyamide rheological additive of claim 1 wherein the monocarboxylic acid capping agent is unsaturated.

19. The polyamide rheological additive of claim 18 wherein the unsaturated hydroxylated monocarboxylic acid has a single double bond.

20. The polyamide rheological additive of claim 1 wherein the monocarboxylic acid capping agent is unsaturated and hydroxylated.

21. The polyamide rheological additive of claim 20 wherein the monocarboxylic acid capping agent is ricinoleic acid.

22. The polyamide rheological additive of claim 1 wherein the reaction product has number average molecular weight of from about 500 to about 12,000.

23. The polyamide rheological additive of claim 1 wherein the reaction product has a number average molecular weight of from about 1,250 to about 8,500.

24. The polyamide rheological additive of claim 1 wherein the reaction product has a number average molecular weight of from about 1,250 to about 4,000.

25. The polyamide rheological additive of claim 1 wherein the amount of the active hydrogen compound reacted to form the reaction product is from about 1.0 to about 3.0 moles per mole of reacted polycarboxylic acid.

26. The polyamide rheological additive of claim 1 wherein the amount of the active hydrogen compound reacted to form the reaction product is from about 1.0 to about 2.0 moles per mole of reacted polycarboxylic acid.

27. The polyamide rheological additive of claim 1 wherein the amount of capping agent is in the range of from about 0.3 to about 2.0 moles per mole of polycarboxylic acid.

28. The polyamide rheological additive of claim 1 wherein the polycarboxylic acid is a high purity dimerized fatty acid derived from an oil selected from at least one of soy bean oil, tall oil, castor oil or unsaturated tallow oil, the active hydrogen compound is 1,6-diaminohexane and the capping agent is ricinoleic acid.

29. A predispersed mixture of a polyamide rheological additive in an organic solvent, said polyamide rheological additive comprising the reaction product of:
   (a) polycarboxylic acid having at least 5 carbon atoms per carboxylic acid group;
   (b) active hydrogen compound having the formula $X_m-R-Y_n$ wherein R represents a group containing from 2 to 12 carbon atoms, X and Y are independently selected from primary amino, secondary amino or hydroxyl and m and n are at least 1 and the sum of (m+n) is at least 2 with the proviso that at least 50% of the X and Y groups participating in the reaction are selected from primary amino, secondary amino or a mixture thereof; and
   (c) capping agent comprised of monocarboxylic acid having from 16 to 22 carbon atoms and which is at least one of unsaturated or hydroxylated, said capping agent being present in an amount sufficient to cap the active hydrogen compound ends of the reaction product of the polycarboxylic acid and the active hydrogen compound wherein the amount of the active hydrogen compound reacted to form the reaction product is from about 1.0 to about 4.0 moles per mole of reacted polycarboxylic acid and wherein the amount of capping agent is in the range of from about 0.17 to about 2.0 moles per mole of polycarboxylic acid.

30. The predispersed mixture of claim 29 wherein the organic solvent is comprised of alcohol selected from methanol, ethanol, 1-propanol, 2-propanol, 1-butanol, 2-butanol, isobutanol, isoamylbutanol or mixtures thereof.

31. The predispersed mixture of claim 30 wherein the alcohol is 2-propanol.

32. The predispersed mixture of claim 30 wherein the organic solvent is comprised of at least about 25% by weight of the alcohol.

33. The predispersed mixture of claim 29 wherein the polyamide rheological additive is present in the mixture in an amount of from about 5 to about 75% by weight of the mixture.

34. The predispersed mixture of claim 29 wherein the polyamide rheological additive is present in the mixture in an amount of from about 25 to about 50% by weight of the mixture.

35. The predispersed mixture of claim 29 wherein the organic solvent further contains an aliphatic organic solvent.

36. The predispersed mixture of claim 25 wherein the aliphatic solvent is selected from mineral spirits, mineral oil, hexanes, heptanes or mixtures thereof.

37. The predispersed mixture of claim 29 wherein the organic solvent further contains an aromatic solvent.

38. The predispersed mixture of claim 37 wherein the aromatic solvent is selected from benzene, toluene, xylenes, ethyl benzene, naphthalene-containing solvent or mixtures thereof.

39. The predispersed mixture of claim 29 wherein the organic solvent is a mixture of 2-propanol and toluene.

40. The predispersed mixture of claim 39 wherein the weight ratio of 2-propanol to toluene is from about 1:1 to about 1:9.

41. The predispersed mixture of claim 29 wherein the monocarboxylic acid capping agent is hydroxylated.

42. The predispersed mixture of claim 41 wherein the monocarboxylic acid capping agent contains a single hydroxyl group.

43. The predispersed mixture of claim 29 wherein the monocarboxylic acid capping agent is unsaturated.

44. The predispersed mixture of claim 43 wherein the unsaturated hydroxylated monocarboxylic acid has a single double bond.

45. The predispersed mixture of claim 29 wherein the monocarboxylic acid capping agent is unsaturated and hydroxylated.

46. The predispersed mixture of claim 45 wherein the monocarboxylic acid capping agent is ricinoleic acid.

47. The predispersed mixture of claim 29 wherein the polycarboxylic acid is a high purity dimerized fatty acid derived from an oil selected from at least one of soy bean oil, tall oil, castor oil or unsaturated tallow oil, the active hydrogen compound is 1,6-diaminohexane and the capping agent is ricinoleic acid.

48. A thickened organic solvent-based composition containing a polyamide rheological additive in an amount sufficient to increase the viscosity of the composition, said polyamide rheological additive comprising the reaction product of:
  (a) polycarboxylic acid having at least 5 carbon atoms per carboxylic acid group;
  (b) active hydrogen compound having the formula $X_m$—R—$Y_n$ wherein R represents a group containing from 2 to 12 carbon atoms, X and Y are independently selected from primary amino, secondary amino or hydroxyl and m and n are at least 1 and the sum of (m+n) is at least 2 with the proviso that at least 90% of the X and Y groups participating in the reaction are selected from primary amino, secondary amino or a mixture thereof; and
  (c) capping agent comprised of monocarboxylic acid having from 16 to 22 carbon atoms and which is at least one of unsaturated or hydroxylated, said capping agent being present in an amount sufficient to cap the active hydrogen compound ends of the reaction product of the polycarboxylic acid and the active hydrogen compound wherein the amount of the active hydrogen compound reacted to form the reaction product is from about 1.0 to about 4.0 moles per mole of reacted polycarboxylic acid and wherein the amount of capping agent is in the range of from about 0.17 to about 2.0 moles per mole of polycarboxylic acid.

49. The thickened organic solvent based composition of claim 48 wherein the composition is based on an aromatic solvent.

50. The thickened organic solvent based composition of claim 49 wherein the solvent comprises xylene.

51. The thickened organic solvent based composition of claim 48 wherein the composition is based on an aliphatic solvent.

52. The thickened organic solvent based composition of claim 48 wherein the composition is selected from aromatic alkyd enamel, solvent-based paints, aliphatic alkyd paints, sealants, on mixtures thereof.

53. The thickened organic solvent based composition of claim 48 wherein the polycarboxylic acid is an oligomer of fatty acid having from 16 to 18 carbon atoms.

54. The thickened organic solvent based composition of claim 53 wherein the active hydrogen compound includes a diamine having from 6 to 12 carbon atoms.

55. The thickened organic solvent based composition of claim 54 wherein the monocarboxylic acid contains a single hydroxyl group.

56. The thickened organic solvent based composition of claim 48 wherein the monocarboxylic acid capping agent is hydroxylated.

57. The thickened organic solvent based composition of claim 56 wherein the moncarboxylic acid capping agent contains a single hydroxyl group.

58. The thickened organic solvent based composition of claim 48 wherein the monocarboxylic acid capping agent is unsaturated.

59. The thickened organic solvent based composition of claim 58 wherein the unsaturated monocarboxylic acid has a single double bond.

60. The thickened organic solvent based composition of claim 48 wherein the monocarboxylic acid capping agent is unsaturated and hydroxylated.

61. The thickened organic solvent based composition of claim 60 wherein the monocarboxylic acid capping agent is ricinoleic acid.

62. The thickened organic solvent based composition of claim 48 wherein the polycarboxylic acid is a high purity dimerized fatty acid derived from an oil selected from at least one of soy bean oil, tall oil, castor oil or unsaturated tallow oil, the active hydrogen compound is 1,6-diaminohexane and the capping agent is ricinoleic acid.

* * * * *

UNITED STATES PATENT AND TRADEMARK OFFICE
CERTIFICATE OF CORRECTION

PATENT NO. : 4,778,843

DATED : October 18, 1988

INVENTOR(S) : Cooperman et al

It is certified that error appears in the above-identified patent and that said Letters Patent is hereby corrected as shown below:

Column 15, line 33, after "has" insert -- a --.

Column 16, line 42, amend "25" to -- 35 --.

Signed and Sealed this

Twenty-first Day of March, 1989

Attest:

DONALD J. QUIGG

*Attesting Officer*

*Commissioner of Patents and Trademarks*